United States Patent
Wilkinson et al.

(10) Patent No.: US 7,873,998 B1
(45) Date of Patent: Jan. 18, 2011

(54) RAPIDLY PROPAGATING THREAT DETECTION

(75) Inventors: Mark L. Wilkinson, Austin, TX (US); Dirk Ourston, Dripping Springs, TX (US)

(73) Assignee: Trustwave Holdings, Inc., Chicago, IL (US)

( * ) Notice: Subject to any disclaimer, the term of this patent is extended or adjusted under 35 U.S.C. 154(b) by 1582 days.

(21) Appl. No.: 11/184,941

(22) Filed: Jul. 19, 2005

(51) Int. Cl.
G08B 23/00 (2006.01)
G06F 15/173 (2006.01)

(52) U.S. Cl. .......................... 726/22; 726/13; 726/14

(58) Field of Classification Search .................. 726/22, 726/23, 24, 25, 14, 13; 713/160, 161, 162, 713/163
See application file for complete search history.

(56) References Cited

U.S. PATENT DOCUMENTS

| | | | | |
|---|---|---|---|---|
| 5,311,593 A * | 5/1994 | Carmi | 713/162 |
| 5,623,600 A * | 4/1997 | Ji et al. | 726/24 |
| 5,850,515 A * | 12/1998 | Lo et al. | 714/43 |
| 6,119,236 A * | 9/2000 | Shipley | 726/22 |
| 6,742,045 B1 * | 5/2004 | Albert et al. | 709/238 |
| 7,007,169 B2 * | 2/2006 | Lingafelt et al. | 713/188 |
| 7,089,428 B2 * | 8/2006 | Farley et al. | 726/22 |
| 7,328,349 B2 * | 2/2008 | Milliken | 713/181 |
| 7,454,499 B2 * | 11/2008 | Cantrell et al. | 709/225 |
| 7,467,410 B2 * | 12/2008 | Graham et al. | 726/23 |
| 7,512,980 B2 * | 3/2009 | Copeland et al. | 726/23 |
| 7,650,638 B1 * | 1/2010 | Njemanze et al. | 726/23 |
| 7,730,175 B1 * | 6/2010 | Roesch et al. | 709/224 |
| 2002/0078381 A1 * | 6/2002 | Farley et al. | 713/201 |
| 2002/0112076 A1 * | 8/2002 | Rueda et al. | 709/245 |
| 2003/0115485 A1 * | 6/2003 | Milliken | 713/201 |
| 2003/0154399 A1 * | 8/2003 | Zuk et al. | 713/201 |
| 2003/0214959 A1 * | 11/2003 | Wang | 370/401 |
| 2003/0236995 A1 * | 12/2003 | Fretwell, Jr. | 713/200 |
| 2004/0064737 A1 * | 4/2004 | Milliken et al. | 713/201 |
| 2005/0210533 A1 * | 9/2005 | Copeland et al. | 726/23 |
| 2006/0029074 A2 * | 2/2006 | Bauer | 370/390 |
| 2006/0036768 A1 * | 2/2006 | Furukawa et al. | 709/245 |
| 2006/0117386 A1 * | 6/2006 | Gupta et al. | 726/23 |
| 2006/0155865 A1 * | 7/2006 | Brandt et al. | 709/230 |
| 2006/0203721 A1 * | 9/2006 | Hsieh et al. | 370/229 |
| 2006/0265746 A1 * | 11/2006 | Farley et al. | 726/22 |
| 2007/0121596 A1 * | 5/2007 | Kurapati et al. | 370/356 |
| 2008/0109879 A1 * | 5/2008 | Bhagwat et al. | 726/3 |
| 2009/0158435 A1 * | 6/2009 | Milliken et al. | 726/24 |
| 2009/0245174 A1 * | 10/2009 | Chen | 370/328 |

FOREIGN PATENT DOCUMENTS

WO    WO 01/84285 A2    11/2001

* cited by examiner

*Primary Examiner*—Eleni A Shiferaw
(74) *Attorney, Agent, or Firm*—D'Ann Naylor Rifai; Mary Jo Bertani

(57) ABSTRACT

A method, system, apparatus, and computer-readable medium to detect rapidly propagating threats in a network. A rapidly propagating threat is detected by capturing a series of packets as the packets are communicated to nodes of the organizational network. The rapidly propagating threat can be detected without relying upon a known signature for the threat. Behavior of nodes when sending and receiving packets is examined for patterns typical of worm propagation.

33 Claims, 12 Drawing Sheets

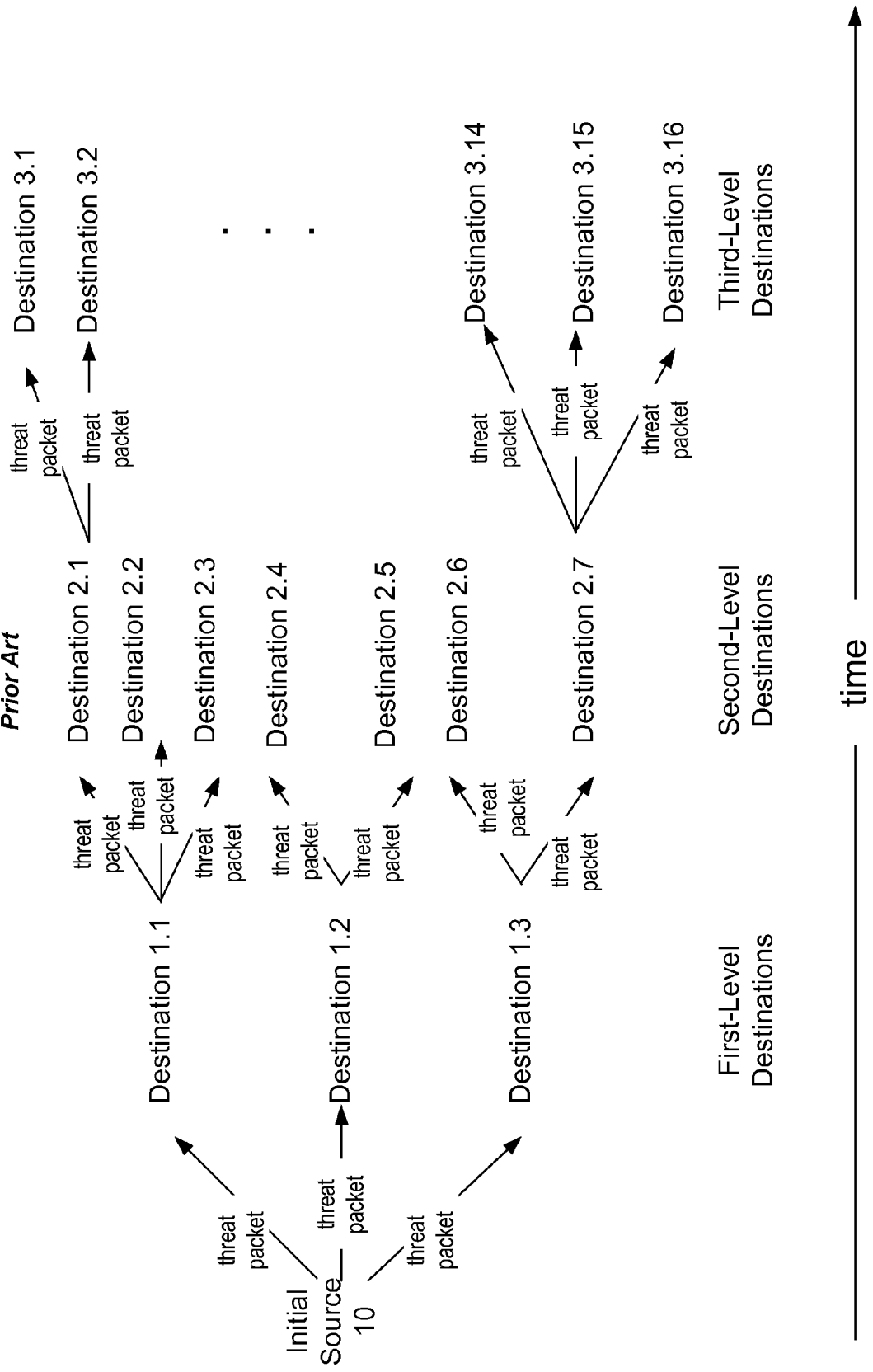

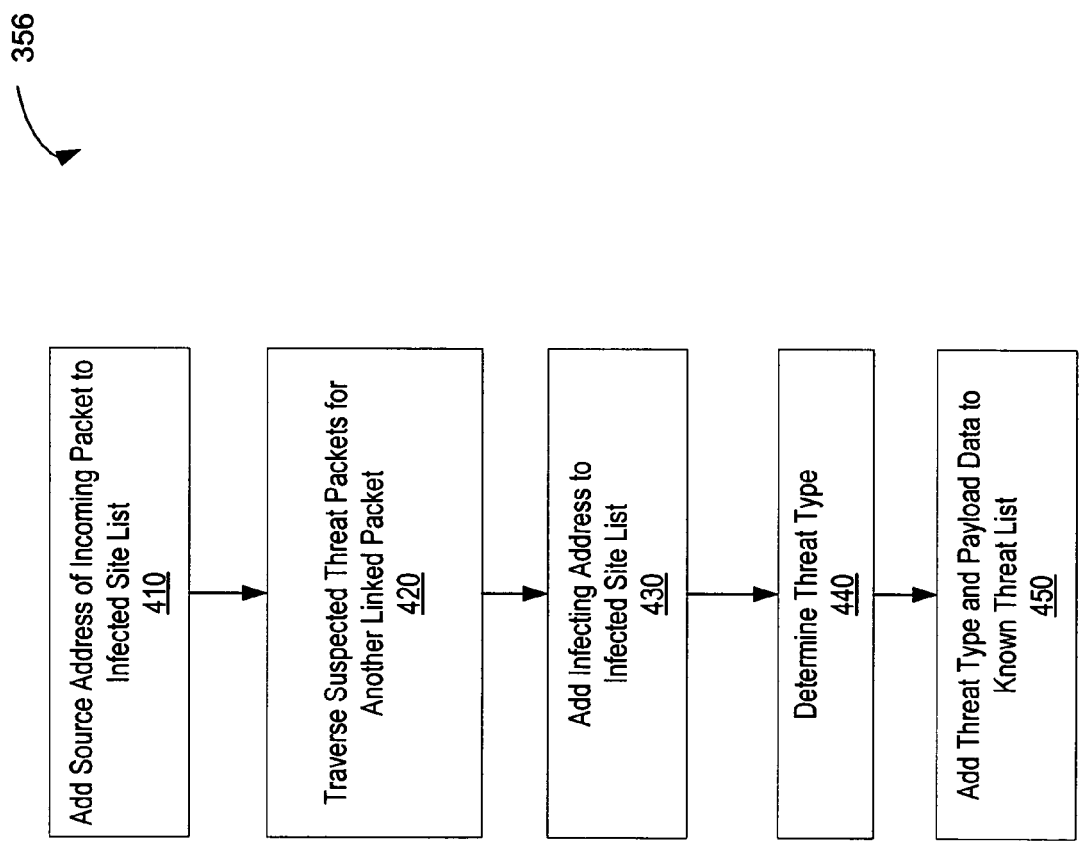

| Event | Packet Data | | | | Previously-Observed Packets | | | Suspected Threat Packets | | |
|---|---|---|---|---|---|---|---|---|---|---|
| | Source | Dest | Header | Payload | Source | Dest | Header | Source | Dest | Header | Payload |
| 6.1 Observe packet 1 | A | B | H1 | P1 | | | | | | |
| 6.2 Add Incoming Packet to Previously-Observed Packets | A | B | H1 | P1 | A | B | H1 | | | |
| 6.3 Search Previously-Observed Packets for Destination Having Value of A ("Linked Packet") | A | B | H1 | P1 | A | B | H1 | | | |
| 6.4 No Linked Packet Found | A | B | H1 | | A | B | H1 | | | |

| Event | Packet Data | | | | Previously-Observed Packets | | | Suspected Threat Packets | | |
|---|---|---|---|---|---|---|---|---|---|---|
| | Source | Dest | Header | Payload | Source | Dest | Header | Source | Dest | Header | Payload |
| 6.5 Observe packet 2 | B | C | H1 | P1 | A | B | H1 | | | | |
| 6.6 Add Incoming Packet to Previously-Observed Packets | B | C | H1 | P1 | B<br>A | C<br>B | H1<br>H1 | | | | |
| 6.7 Search for Linked Packet | B | C | H1 | P1 | B<br>A | C<br>B | H1<br>H1 | | | | |
| 6.8 Find Linked Packet | B | C | H1 | P1 | B<br>A | C<br>B | H1<br>H1 | | | | |
| 6.9 Linked Packet has Matching Invariant Data | B | C | H1 | P1 | B<br>A | C<br>B | H1<br>H1 | | | | |
| 6.10 Process Incoming Packet as Suspected Threat | B | C | H1 | | A | B | H1 | B | C | H1 | P1 |

*Fig. 6C*

| Event | Packet Data | | | Previously-Observed Packets | | | Suspected Threat Packets | | |
|---|---|---|---|---|---|---|---|---|---|
| | Source | Dest | Header | Payload | Source | Dest | Header | Source | Dest | Header | Payload |

| Event | Source | Dest | Header | Payload | Source | Dest | Header | Source | Dest | Header | Payload |
|---|---|---|---|---|---|---|---|---|---|---|---|
| 6.11 Search Suspected Threat Packets for Linked Packet | B | C | H1 | P1 | A | B | H1 | B | C | H1 | P1 |
| 6.12 No Linked Packet Found | B | C | H1 | P1 | A | B | H1 | B | C | H1 | P1 |
| 6.13 Observe packet 3 | C | D | H1 | P1 | A | B | H1 | B | C | H1 | P1 |
| 6.14 Add Incoming Packet to Previously-Observed Packets | C | D | H1 | P1 | C / A | D / B | H1 / H1 | B | C | H1 | P1 |
| 6.15 Search for Linked Packet | C | D | H1 | P1 | C / A | D / B | H1 / H1 | B | C | H1 | P1 |
| 6.16 Linked Packet Found | C | D | H1 | P1 | C / A | D / B | H1 / H1 | B | C | H1 | P1 |

Fig. 6D

| Event | Packet Data | | | | Previously-Observed Packets | | | Suspected Threat Packets | | | |
|---|---|---|---|---|---|---|---|---|---|---|---|
| | Source | Dest | Header | Payload | Source | Dest | Header | Source | Dest | Header | Payload |
| 6.17 Process Incoming Packet as Suspected Threat Packet | C | D | H1 | P1 | A | B | H1 | C<br>B | D<br>C | H1<br>H1 | P1<br>P1 |
| 6.18 Compare Payloads in Linked Packets | C | D | H1 | P1 | A | B | H1 | C<br>B | D<br>C | H1<br>H1 | P1<br>P1 |
| 6.19 Payload Match Found | C | D | H1 | P1 | A | B | H1 | C<br>B | D<br>C | H1<br>H1 | P1<br>P1 |
| 6.20 Threat Identified | C<br>infected | | | | | | | C<br>B | D<br>C | H1<br>H1 | P1<br>P1 |
| 6.21 Traverse Suspected Threats for Infecting Source | | | | | | | | C<br>B<br>infected | D<br>C | H1<br>H1 | P1<br>P1 |
| 6.22 Site B Identified | | | | | | | | C<br>B | D<br>C | H1<br>H1 | P1<br>P1 |

RAPIDLY PROPAGATING THREAT DETECTION

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

FIELD OF INVENTION

This invention, in general, relates to a system and method for detecting rapidly propagating threats in a network without requiring a known signature for the threat.

BACKGROUND OF THE INVENTION

Global networking of computers has greatly affected business. As the number of computers linked to networks grows, businesses increasingly rely on networks to interact. More and more people use electronic mail, websites, various file transfer methods, and remote office applications, among other types of software, to facilitate business transactions and perform job related tasks.

These applications and uses still rely on early network addressing technologies and flow control protocols to transmit data packets across networks. For example, the Internet Protocol (IP) is an addressing protocol for referencing remote devices on a network. The protocol is implemented to include a packet header that contains bits representing an address of the source, an address of the target, and various other parameters associated with the packet. The Address Resolution Protocol (ARP) is used to reconcile physical addresses on local segments of a network with IP addresses. Other protocols are used for flow control including Transmission Control Protocol (TCP) and User Datagram Protocol (UDP). These protocols may be used to control the flow of packets across a network (e.g., between different network segments) including subdividing and reassembling the packets. TCP also includes methods for verifying the arrival of a packet. Other protocols include Internet Control Message Protocol (ICMP), Internetwork Packet Exchange (IPX), Simple Network Management Protocol (SNMP), NetBios, and ARP, among others. Historically, these protocols were designed for use on a trusted network and as such do not include many security features. To address this problem, newer protocols are designed to include some security measures. However, at present, the global Internet and many local area networks predominantly use older protocols with various vulnerabilities.

Hackers and malfeasants take advantage of the weaknesses in these protocols to disrupt, infiltrate, or destroy networked devices. These attacks include denial-of-services attacks, infiltration attacks, viruses, and worms, among others. Denial-of-services attacks often limit the network activity of a target computer by inundating the target with requests or messages. In one example, an attacking computer or set of computers may send a plethora of low level pings to the target device. If the pings include a non-existent return address, the target machine could send a response message and pause over a timeout period waiting for a response. In attempting to respond to the pings, the target machine effectively denies network access to other applications.

Infiltrating attacks often circumvent password security and gain access to files. Once the attacker has accessed the network, the attacker may steal private information such as credit card or social security numbers. Moreover, the attacker may damage valuable data, install a worm or spying program, or install programs to utilize computational capacity. Hackers use various tools and methodologies to discover vulnerable devices and interact with them. These tools include address scanners, port scanners, worms, and packet formulation programs, among others. For example, a hacker may send reconnaissance packets to a local network segment in search of a computer or device. Once a device is found, the hacker may scan the ports on the device in search of a vulnerable port. Reconnaissance detection activities watch for a pattern of activity where an attacker first obtains knowledge of the internal addresses of the target devices, and then uses those internal addresses as target recipients of a virus or worm.

Viruses infect files and utilize vulnerabilities of programs that interpret the files to propagate. A virus may also function to erase data. Viruses are usually small computer programs that attach themselves to existing computer programs in the target computer.

Viruses can be transmitted over the Internet using some form of likely-to-be-transmitted computer data structure—in many cases, an e-mail message. The virus contains a mechanism that allows the virus program to be activated from the containing data structure—typically when the e-mail is read. Viruses, in comparison to the other two forms of network threat, are passive: to become active, certain actions are performed on the containing data structure to activate the virus program. For example, with a virus program spread via e-mail, the action is opening an e-mail attachment.

Worms are self-replicating programs that infect computers. In some cases, these worms take advantage of the trusting relationships between computers to infiltrate a network and send network data to other internal computers and devices. In contrast to viruses, worms are typically independent of other actions, programs, or data structures. Worm programs are propagated using existing network protocols, such as ICMP or SNMP, and typically do not require either human intervention or any form of external activation, such as opening an email attachment.

Network worms are characterized by their need to propagate. To propagate, network worms contain operating instructions, also referred to as code or code blocks. These operating instructions can take the form of a computer program, designed to execute on the target computer, or commands to Internet services on the target computer using, for example, the Hypertext Transfer Protocol (HTTP) protocol. In general, the worm provides some method for gaining control of the target to accomplish the worm's objectives on the target and to continue to propagate.

FIG. 1 is a diagram showing progression of a rapidly propagating threat. Assume that initial source 10 is the originator of a rapidly propagating threat, whether the threat is internal or external to the target organization's computer infrastructure. For example, initial source 10 may be a node within an internal network environment of the organization that has been compromised and has begun to disseminate worm packets. Alternatively, internal source 10 may be a computer system external to the target organization that infiltrates the target organization's security mechanisms to infect the internal network environment. Threat packets are distributed through the organizational structure in a "spreading activation model."

In FIG. 1, assume that initial source 10 obtains the addresses of three destinations internal to the target organization's computer infrastructure. Initial source 10 sends packets to the target organization's first-level destinations, which are identified in FIG. 1 as destinations 1.1, 1.2, and 1.3. One of skill in the art will recognize that the number of destination addresses can vary and that three destinations are used as an example only. Furthermore, while unique destinations are shown at each of the first-, second-, and third-level destinations, one of skill will recognize that it is possible for an infected node to send threat packets to an already-infected node, thereby re-infecting the node and causing additional threat packets to be sent.

In FIG. 1, assume that the worm is triggered as soon as a threat packet is received at destinations 1.1, 1.2, and 1.3. As a result of receiving a threat packet, each of destinations 1.1, 1.2, and 1.3 sends another threat packet to one or more internal destinations to which that destination can communicate data. For example, destination 1.1 is shown as sending threat packets to second-level destinations 2.1, 2.2, and 2.3; destination 1.2 is shown as sending threat packets to second-level destinations 2.4 and 2.5; and destination 1.3 is shown as sending packets to second-level destinations 2.6 and 2.7. In turn, destination 2.1 is shown as sending a threat packet to each of third-level destinations 3.1 and 3.2, and destination 2.7 is shown as sending a threat packet to each of third-level destinations 3.14, 3.15, and 3.16. As one of skill in the art will recognize, such a threat has the possibility of infecting an exponential number of destinations very rapidly.

In the example of FIG. 1, each of the destinations is unique. One of skill in the art will recognize that a given destination may be re-infected when that destination receives threat packets from more than one source address. In addition, the same source address may transmit additional threat packets to an already-infected device.

The current state-of-the-art in worm detection uses signatures describing the worm structure. Signatures include combinations of instructions, also referred to as code, that are contained in the data portion of the worm message; these instructions are unique to that particular worm. Signatures are derived manually from an examination of infected network traffic. Typically, the time involved in creating a signature is such that the worm has done extensive damage before the worm defense (containing the signature) is completed.

Similarly, anti-virus software typically relies on signatures to detect viruses. As such, frequent updates are required to maintain a current database of virus signatures. If an undocumented virus enters the network, the anti-virus software will likely fail. Furthermore, most anti-virus software resides on each host machine within the network. If the anti-virus software can be defeated by an attack on one host machine, every instance of the anti-virus software on every host machine can be defeated.

Many network security systems suffer from deficiencies in detecting and preventing attacks on a network. Many other problems and disadvantages of the prior art will become apparent to one skilled in the art of network security systems after comparing such prior art with the present invention as described herein.

SUMMARY OF THE INVENTION

Features of the invention may be found in a system, method, computer-readable medium, and apparatus that detect rapidly propagating threats in a network. A rapidly propagating threat is detected by capturing a series of packets as the packets are communicated to nodes (such as computer systems or devices) connected to the organizational network. The rapidly propagating threat can be detected without relying upon a known signature for the threat. Behavior of nodes when sending and receiving packets is examined for patterns typical of worm propagation.

In one feature of the invention, a series of packets is examined for packets that are "linked" to one another. One packet is considered to be linked to another if the destination address for one packet serves as the source address for another packet. This link in communication shows that a node has received a packet and subsequently sent another packet. A set of data is extracted from headers of the linked packet and the incoming packet that can be used to identify patterns of behavior in communication. In one embodiment, the set of data is an invariant set of data, such as a protocol and destination port, that is expected to be constant for all packets for a given rapidly propagating threat. If the linked packet and the incoming packet contain the same set of invariant data in the packet headers, the two packets are examined more closely as a suspected rapidly propagating threat. For example, the payload values can be compared, and, if they match, the incoming packet can be processed further as part of a rapidly propagating threat. Alternatively, rather than comparing raw payload values, a value can be calculated from each respective payload, and the two values can be compared. If the two values match, the incoming packet can be processed further as a rapidly propagating threat.

A system, method, apparatus, and computer-readable medium for detecting rapidly propagating threats in a network are described. Other aspects, advantages and novel features of the present invention will become apparent from the detailed description of the invention when considered in conjunction with the accompanying drawings.

BRIEF DESCRIPTION OF THE DRAWINGS

For a more complete understanding of the present invention and advantages thereof, reference is now made to the following description taken in conjunction with the accompanying drawings in which like reference numbers indicate like features.

FIG. 1 is a diagram showing progression of a rapidly propagating threat, as described above.

FIG. 4 is a flowchart showing one possible implementation of the "Process Incoming Packet as Part of Rapidly Propagating Threat" step of the flowchart of FIG. 3B.

FIGS. 6A, 6B, 6C, and 6D collectively show a series of events as packets are processed in accordance with the flowcharts of FIGS. 3A and 3B.

DETAILED DESCRIPTION

Because of the problems with using signatures for worm and virus protection, there has recently been increased interest in behavior-based methods for detection of rapidly propagating threats. Behavior-based methods observe packet behavior rather than watch for a given signature. One of the benefits of behavior-based methods is that such methods can be applied in real time, while the worm is still propagating. In some cases, the detection algorithm actually learns the detection criteria for the worm by watching the worm in action.

A typical rapidly propagating threat will be made up of a set of packets that are communicated in accordance with the same protocol to the same destination port of the target address. For example, a set of packets may be communicated to port 25, which is a port commonly used for e-mail communication, using the TCP protocol via the Internet. A series of packets, with each of the packets containing an identical code block that causes the worm program to propagate, can be used to identify a worm while the worm is propagating. When a series of packets with identical code blocks is detected propagating from one node to another in a network, such a series of packets indicates a possible rapidly propagating threat.

Figure 2A:
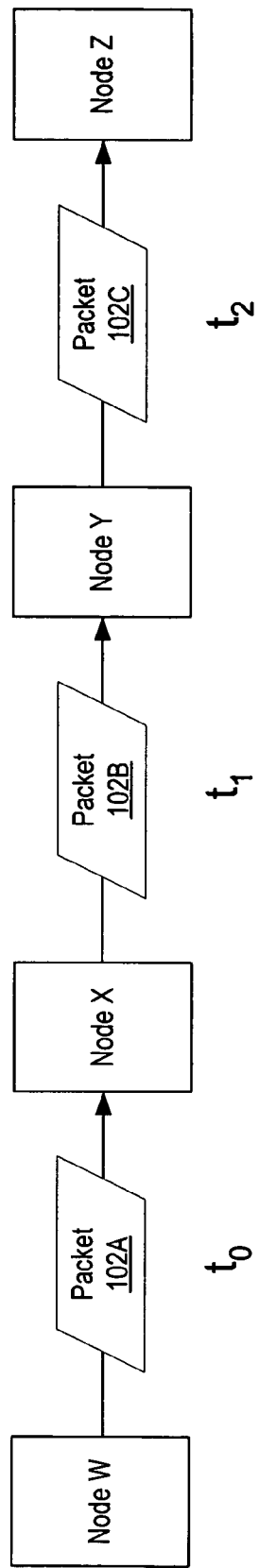
FIG. 2A shows a pattern of behavior observed with a rapidly propagating threat.

FIG. 2A shows a pattern of behavior observed with a rapidly propagating threat. Four nodes—nodes W, X, Y, and Z—are shown and are assumed to be interconnected via a network (not shown). At time $t_0$, node W communicates packet 102A to node X. In response to receiving packet 102A, node X communicates packet 102B to node Y at time $t_1$ (after time $t_0$). In response to receiving packet 102B, node Y communicates packet 102C to node Z at time $t_2$ (after time $t_1$). If packet 102A contains a threat that is rapidly propagating, packet 102A infects node X, which causes node X to send a packet 102B in response to receiving packet 102A. Similarly, packet 102B spreads the rapidly propagating threat to node Y, and packet 102C spreads the rapidly propagating threat to node Z. Packets flowing in accordance with this basic scenario are described further in FIGS. 2B and 2C.

Figure 2B:
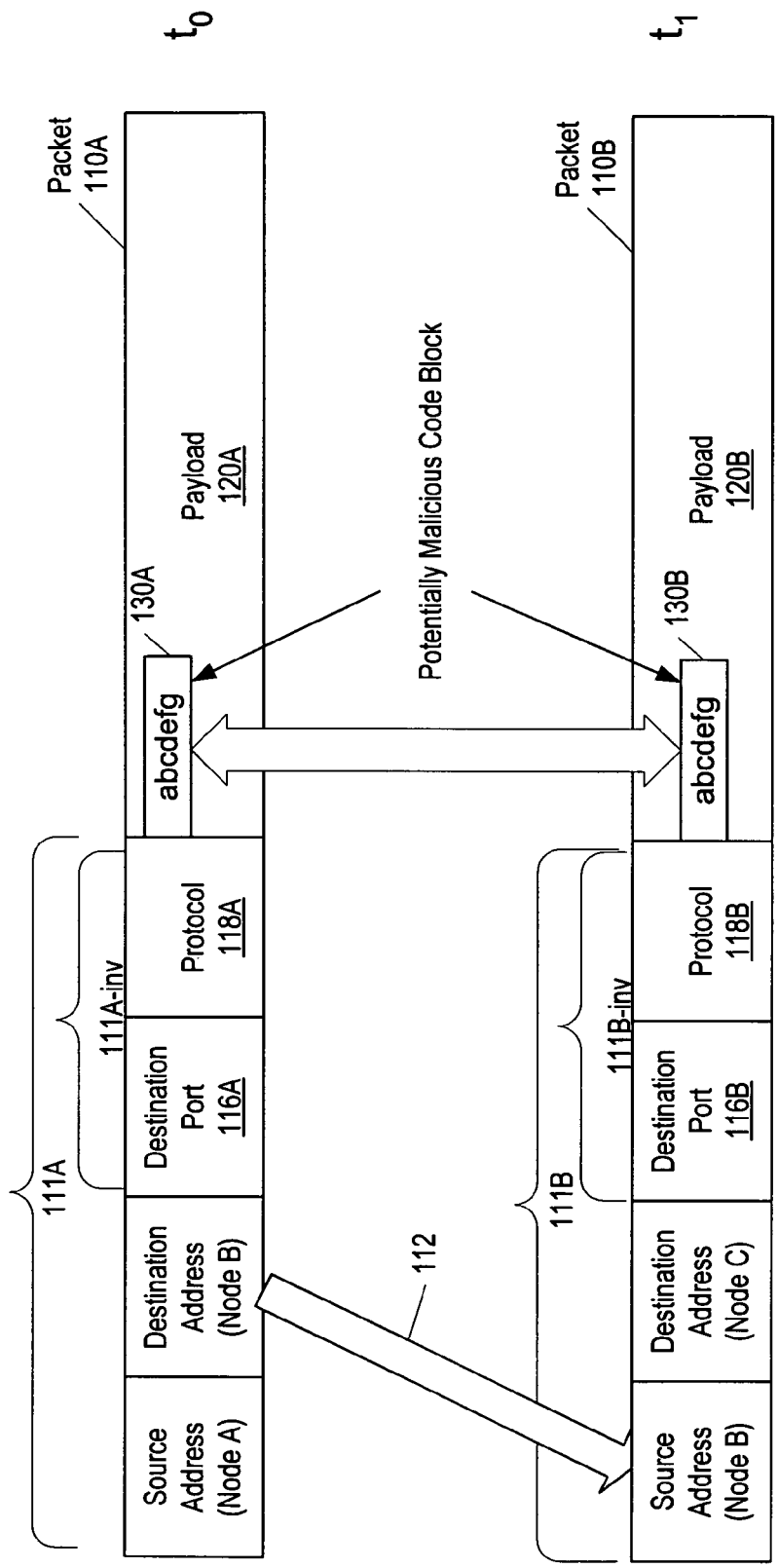
FIGS. 2B and 2C are a diagram of a series of packets that can be used to identify a rapidly propagating threat in accordance with one embodiment of the invention.
Figure 2C:
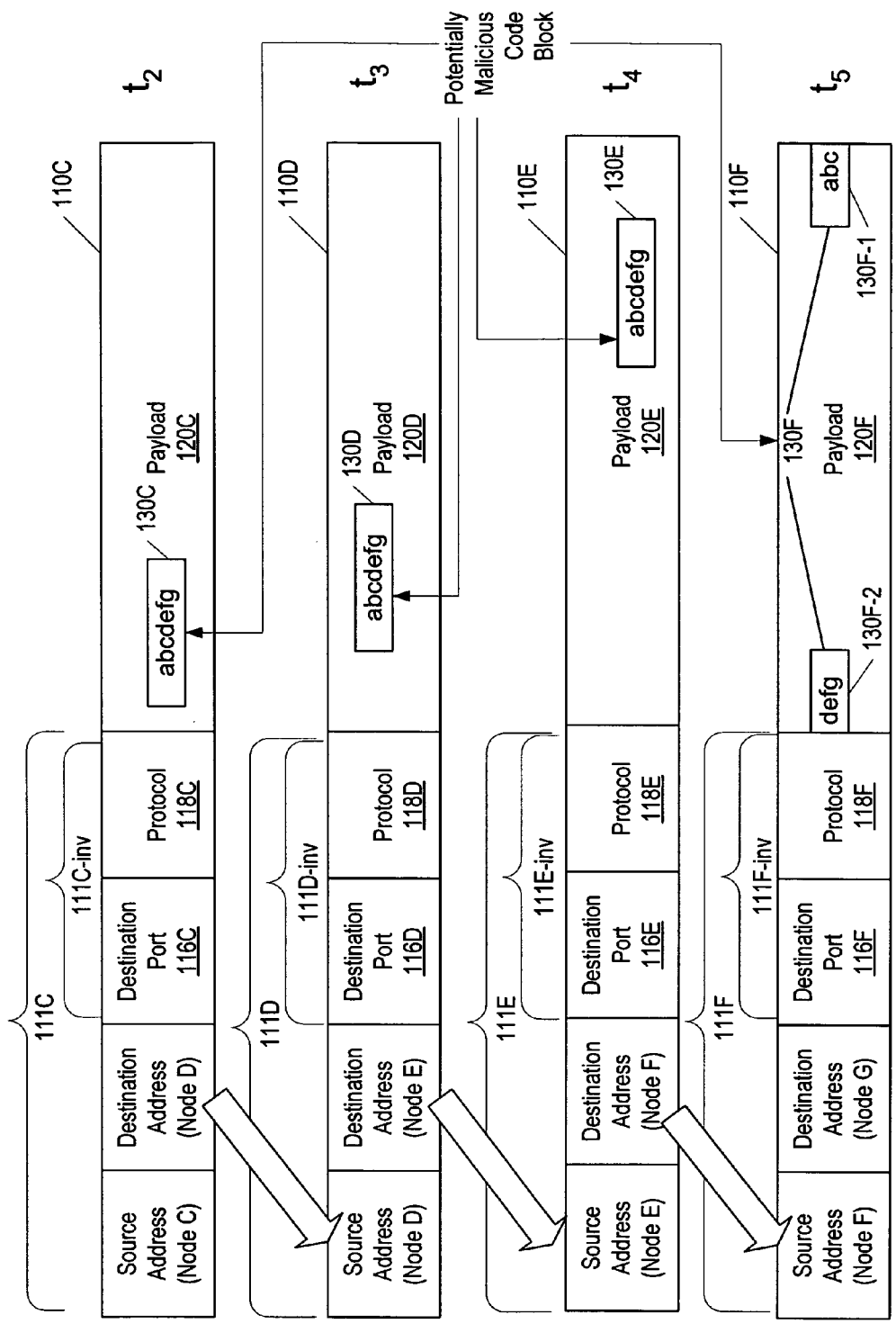

FIGS. 2B and 2C show a series of packets that are part of a rapidly propagating threat. Packets 110A through 110F are shown in time sequence order. In FIG. 2B, packet 110A is sent by a node called node A to another node called node B at time $t_0$. Packet 110A follows a communication behavior similar to the communication behavior of packet 102A of FIG. 2A. Packet 110B is sent at time $t_1$ by node B to a node called node C. In this example, the destination address of packet 110A (node B) matches the source address of packet 110B (node B), as shown by the arrow 112. Packet 110B follows a communication pattern similar to the communication behavior of packet 102B of FIG. 2A.

Each of packets 110A through 110F in FIGS. 2B and 2C contains a header, respectively headers 111A through 111F. Each of packet headers 111A through 111F contains a set of data labeled with an -inv suffix to indicate that the set of data is examined for an invariant pattern. In this example, these sets of invariant data for packets 110A through 110F include, respectively, 111A-inv, 111B-inv, 111C-inv, 111D-inv, 111E-inv, and 111F-inv. Each set of invariant data is made up of a destination port and protocol in this example. Other types of header data fields may be used in addition to or instead of the destination port and protocol for identifying a threat from header data. The relevance of each of the sets of data 111A-inv through 111F-inv is discussed in further detail below.

Each of packets 110A through 110F of FIGS. 2B and 2C also contains a source address, as described above; a destination address, also as described above; a destination port, respectively destination ports 116A, 116B, 116C, 116D, 116E, and 116F, each of which forms part of respective invariant data 111A-inv, 111B-inv, 111C-inv, 111D-inv, 111E-inv, and 111F-inv; and a protocol, respectively protocols 118A, 118B, 118C, 118D, 118E, and 118F, each of which also forms part of respective invariant data 111A-inv, 111B-inv, 111C-inv, 111D-inv, 111E-inv, and 111F-inv. Each packet contains a payload, respectively payloads 120A, 120B, 120C, 120D, 120E, and 120F.

Assume that a particular rapidly propagating threat contains a set of code that is a malicious code block. These code blocks are represented in FIGS. 2B and 2C by code blocks 130A, 130B, 130C, 130D, 130E, and 130F. Code block 130F of FIG. 2C contains two sub-blocks, sub-blocks 130E-1 and 130E-2. Each code block is executed whenever the packet is received. For example, assume that the code blocks contain HTML exploit code that performs a traversal of a directory structure on the target machine to identify sensitive data.

In the various packets 110A through 110F, the contents of each of potentially malicious code blocks 130A, 130B, 130C, 130D, 130E, and 130F are the same (represented in FIGS. 2B and 2C by the string 'abcdefg'). Assume that the remaining contents of payloads 120A through 120F also are identical, so that the only difference in the payload portions 120A through 120F is the location of the respective malicious code block. Such a situation can occur when the originator of the threat places the code blocks, such as code blocks 130A through 130F, into various locations in each packet. This attempt to disguise the threat posed by the packets cannot be detected using a simple hash value of the contents of each packet, thereby thwarting easy detection. Another method to disguise a set of threat packets is to insert computer instructions that perform no operation into the code blocks at varying locations. Another situation in which code blocks can be positioned at different locations in packets can occur when communication travels across network segments having different sizes of maximum transmission units (MTUs). Malicious code blocks may be transmitted in portions that are placed into different packets, but that are reassembled into larger packets by, for example, a router. Reassembly of the portions of the malicious code blocks into larger packets may produce larger packets in which the malicious code blocks appear at varying locations.

To detect the threat posed by a set of packets, packets are tracked as communication flows from one node to another in the organizational network. The sets of data 111A-inv through 111F-inv are examined for invariant code blocks to identify behavioral patterns. When the first packet 110A is received, the values of a selected set of data 111A-inv are retained for comparison with subsequent packets in the communication path. The destination address (node B) is also noted. Subsequent activity at the destination address (node B) is then observed. When packet 110B is sent from node B (the previous destination address value is now the source of packet 110B), packet header 111B is searched for the values of the set of data 111A-inv. If the sets of data are the same (e.g., the two sets 111A-inv and 111B-inv have the same destination port and protocol (or other set of data that is likely to be constant across packets involved in a rapidly propagating threat)), further processing of the two packets is performed.

Once a pattern of sending behavior has been observed by one or more recipients of packets having a particular invariant set of data (here the same destination port and protocol), the payloads of the respective packets are compared. In one embodiment, a Message Digest (MD-5) compression algorithm is used to compare packets. Assume that values representing the contents of each of the payloads 120A and 120B are calculated and found to be identical (recall that, in this example, the contents of payloads 120A through 120F are assumed to be identical other than the location of the code blocks 130A through 130F). Because the code blocks 130A and 130B are at identical locations within the packet, comparing hash values from the contents of the entire payload blocks 120A and 120B can detect the fact that each contains an identical code block. If the payloads are identical and one payload contains exploit code, the other payload also contains the exploit code. Packets 110A and 110B can then be further processed as part of a rapidly propagating threat.

FIG. 2C shows an attempt by an attacker to disguise the threat packets by shifting the location of the code blocks, as shown by code blocks 130C, 130D, 130E, and 130F (split into code sub-blocks 130E-1 and 130E-2). Simple hash values computed from each of the payloads 120C, 120D, 120E, and 120F will not produce identical values. However, each of payloads 120C through 120F can be represented as a vector, with each position in the vector corresponding to an element of interest. An element can be a particular bit pattern, set of bytes, vocabulary word, computer instruction, symbol, or other set of data. As a simple example, an element vector may contain 256 positions, one for each character in the extended ASCII character set. A payload vector for a payload containing the phrase "where are the dolphins" vector position would contain a count of the number of times the respective alphabetic character appears in the payload—for example, the vector position for the character 'w' contains a count of 1, the vector position for the character 'h' contains a count of 3, and so on.

In comparing payloads between packets, a direction cosine of two vectors representing two payloads, such as payload 120C and 120D, can be calculated and compared to identify that the contents of the payloads are identical. If the payload, destination port, and protocol are identified as the same, and the initial destination address is a source address for a subsequent packet with identical invariant data, a rapidly propagating threat has been observed and mitigating tactics can be used. Identification of the rapidly propagating threat is described in further detail with reference to FIGS. 3A and 3B below.

Figure 3A:
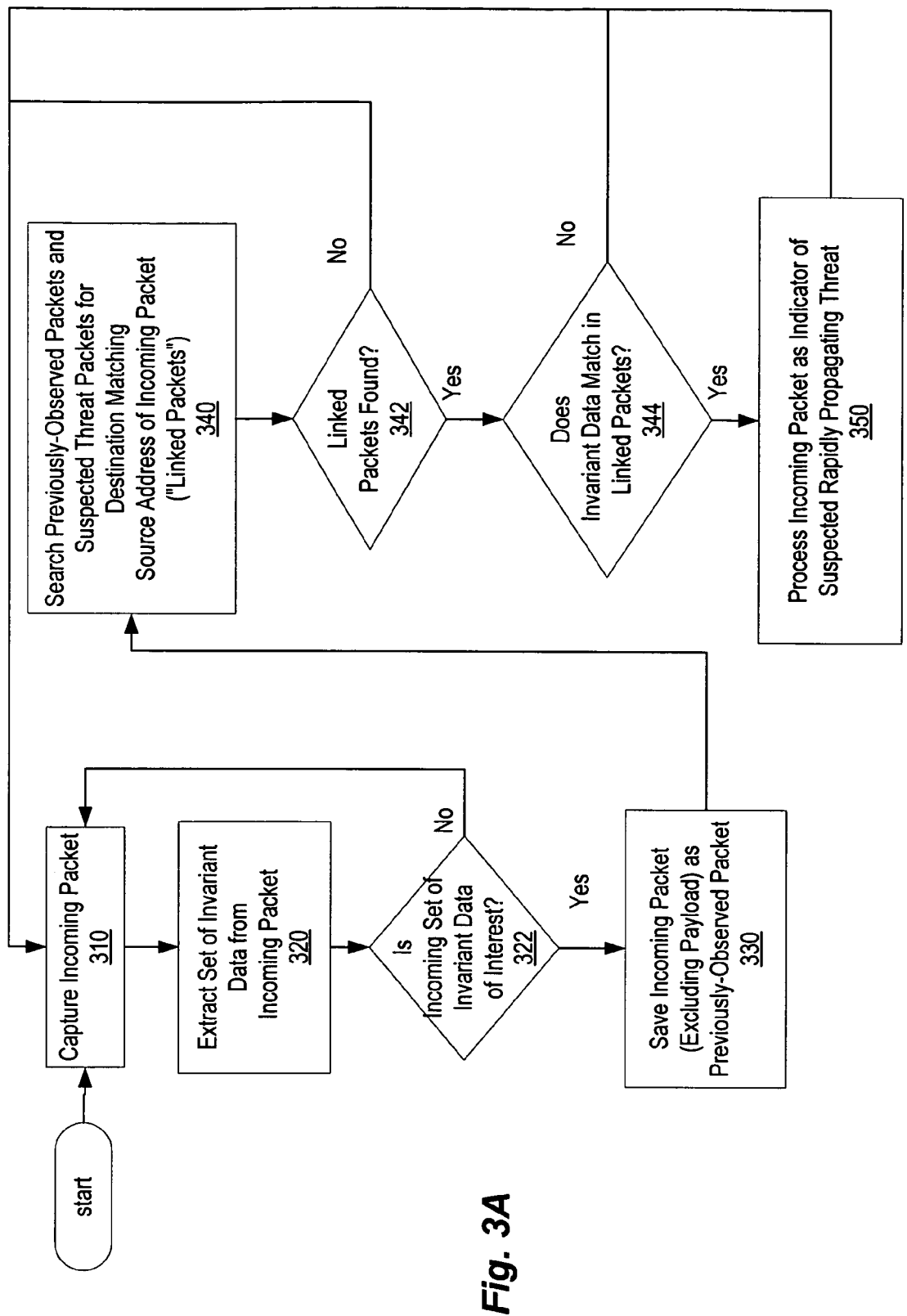
FIG. 3A is a flowchart of a method for detecting a suspected rapidly propagating threat in accordance with one embodiment of the invention.

FIG. 3A is a flowchart of a method for detecting a rapidly propagating threat in accordance with one embodiment of the invention. In "Capture Incoming Packet" step 310, an incoming packet is captured. In one embodiment, each packet is captured by a "snare appliance" placed at a strategic communication point in the internal network. The term "incoming packet" is used with reference to the snare appliance. For example, a snare appliance may be placed at an initial entry point in the internal network, such as near a router or switch, to detect any threat packets communicated by that router or switch. Alternatively, a snare appliance may be placed at other strategic or sensitive locations within an internal network, such as between two critical nodes. A snare appliance is an example of a capturing apparatus, module, means, and/or instructions for capturing packets.

Control proceeds from "Capture Incoming Packet" step 310 to "Extract Set of Invariant Data from Incoming Packet" step 320. In "Extract Set of Invariant Data from Incoming Packet" step 320, the header is examined and a set of invariant data is extracted from the header. Invariant data includes data that are not expected to vary from one packet to another for a given rapidly propagating threat; for example, the protocol is not expected to vary between packets. Invariant data can be described as having functions f and g such that f(packet1)=g (packet2). In this example, the destination port and protocol are extracted as invariant data for comparison to subsequent traffic flowing from the destination address. Therefore, we expect protocol(packet1)=protocol(packet2) and destination_port(packet1)=destination_port(packet2). Alternatively or in addition, other data, such as size of the packets, may be extracted that may be useful in identifying patterns of communication behavior across packets. Extracting data from the packet header can be performed by an extracting apparatus, module, means, and/or instructions.

Control proceeds from "Extract Set of Invariant Data from Incoming Packet" step 320 to "Is Incoming Set of Invariant Data of Interest?" decision point 322. For example, the incoming set of invariant data may not be of interest if the packets are not sufficiently large to carry a payload that is a threat. Another example in which the incoming set of invariant data may not be of interest is when a combination of a particular destination port and protocol is unlikely to identify a threat. For example, a packet formatted in accordance with the TCP/IP protocol and sent to destination port 80 is a very commonly used combination for Internet communication and, standing alone, unlikely to identify a threat. Determining whether an incoming set of invariant data is of interest can be performed by an interest-determining apparatus, module, means, and/or instructions. If the current set of invariant data is not of interest, no action is taken with regard to the incoming packet, and control returns to "Capture Incoming Packet" step 310 to capture another packet.

At "Is Incoming Set of Invariant Data of Interest?" decision point 322, if the incoming set of invariant data is of interest, control proceeds to "Save Incoming Packet (Excluding Payload) as Previously-Observed Packet" step 330. In one embodiment, the incoming packet data, excluding the payload, are maintained for comparison with incoming packets. In one embodiment, data from the previously-observed packets (excluding payload) are stored in a first-in-first-out (FIFO) queue referred to as a packet processing queue, although other means for storing the previously-observed packet data, such as in a database or file, can be used. Saving the previously-observed packets can be performed by a saving apparatus, module, means, and/or instructions.

Control proceeds to "Search Previously-Observed Packets and Suspected Threat Packets for Destination Matching Source Address of Incoming Packet ("Linked Packets")" step 340. If another address has been observed sending packets to the source address of the incoming packet, the sending address may be the originator of the rapidly propagating threat or another infected site. Searching for previously-observed packets that are linked to the incoming packet can be performed by a searching apparatus, module, means, and/or instructions.

At "Linked Packets Found?" decision point 342, a determination is made whether a packet linked to the incoming packet has been found. To be considered linked to the incoming packet, the previously-observed packet has a destination address matching the source address of the incoming packet. This relationship can be described as having functions destination_address(packet1)=source_address(packet2). In addition, time(packet1) should be prior to time(packet2), as we are looking at relationships between packets traveling through the network. This time relationship is maintained by searching for previously-observed packets that are linked to the incoming packet. Determining whether a linked packet is found can be performed by a link-determining apparatus, module, means, and/or instructions. If no linked packet is found at "Linked Packets Found?" decision point 342, control returns to "Capture Incoming Packet" step 310, where another packet is awaited.

At "Linked Packets Found?" decision point 342, if at least one linked packet has been found, control proceeds to "Does Invariant Data Match in Linked Packets?" decision point 344. Determining whether an incoming set of invariant data matches the previously-observed set of invariant data in the linked packet can be performed by an invariant-matching apparatus, module, means, and/or instructions. If the invariant data of the linked packet matches the invariant data of the incoming packet, this behavior pattern indicates a suspected rapidly propagating threat. One of skill in the art will recognize that determining whether the invariant header data matches any previously-observed or suspected threat packet's invariant header data can be performed first, and then a determination can be made whether any linked packets exist within those packets that match the invariant data.

From "Does Invariant Data Match in Linked Packets?" decision point 344, if the invariant data matches, control proceeds to "Process Incoming Packet as Indicator of Suspected Rapidly Propagating Threat" step 350, which is described in further detail with reference to FIG. 3B. The processing performed in "Process Incoming Packet as Indicator of Suspected Rapidly Propagating Threat" step 350 can be performed by a suspect-processing apparatus, module, means, and/or instructions. After processing the incoming packet as an indicator of a suspected rapidly propagating threat, control returns to "Capture Incoming Packet" step 310, where another packet is awaited.

Figure 3B:
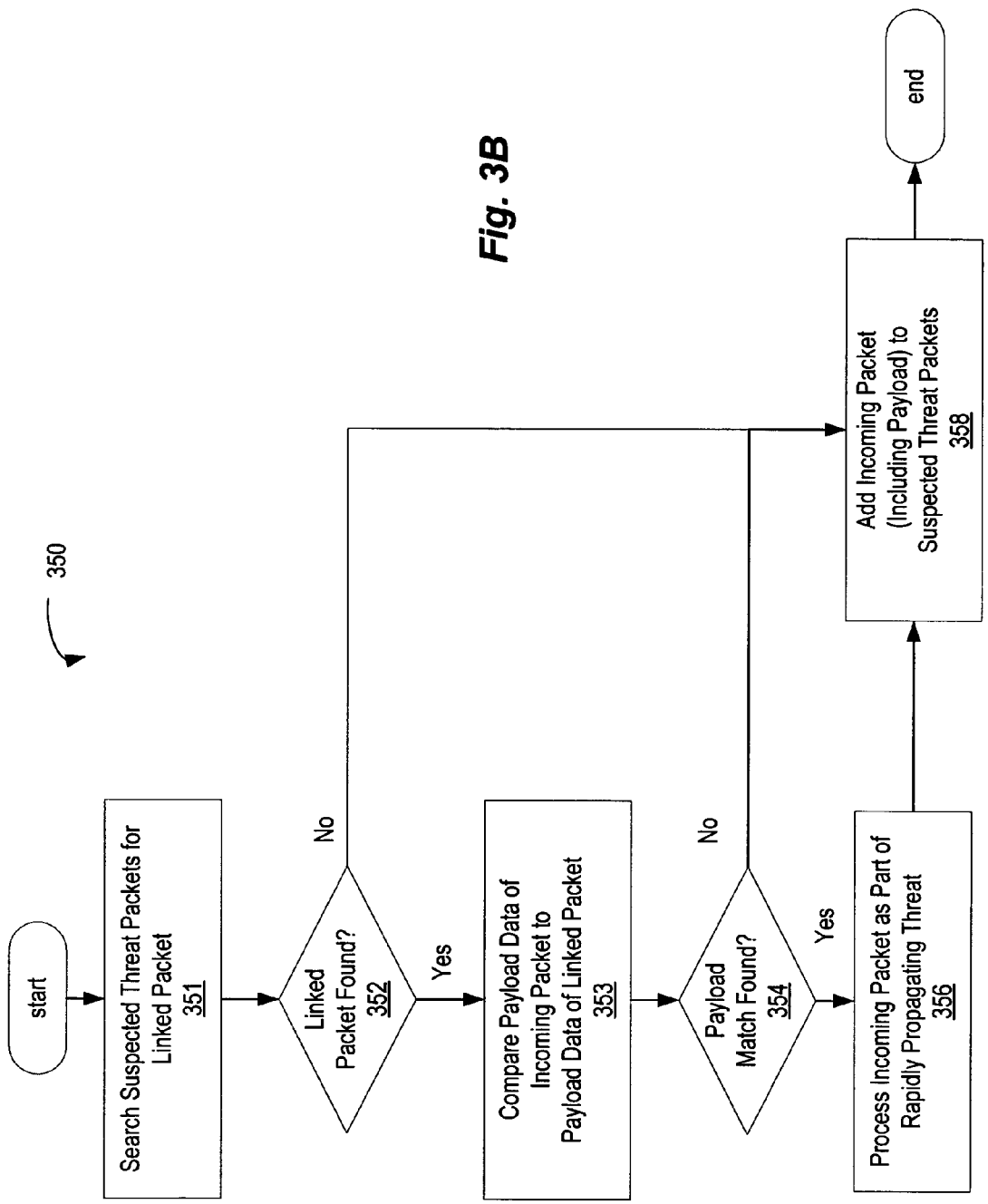
FIG. 3B is a flowchart showing one possible implementation of the "Process Incoming Packet as Indicator of Suspected Rapidly Propagating Threat" step of the flowchart of FIG. 3A.

At this point in the example embodiment of the algorithm shown in FIGS. 3A and 3B, only header data has been processed. Payload data is not processed until a packet linked to the incoming packet is found and a match occurs between invariant data in the linked and incoming packets. In other embodiments of the invention, payload data may be examined first for comparison with a set of payload data known to indicate a rapidly propagating threat.

FIG. 3B is a flowchart of the "Process Incoming Packet as Indicator of Suspected Rapidly Propagating Threat" step 350 of the flowchart of FIG. 3A. Because the incoming packet has been found to have a linked packet with matching invariant header data, the incoming packet is now a suspected threat packet. The payload of the incoming packet is then examined. Control begins with "Search Suspected Threat Packets for Linked Packet" step 351. If a linked packet exists that is also a suspected threat packet, further examination of the incoming packet's payload can be performed. Searching the suspected threat packets for a linked packet can be performed by a searching apparatus, module, means, and/or instructions.

At "Linked Packet Found?" decision point 352, if no linked packet is found in the suspected threat packets, no payload value is available for comparison to the payload of the incoming packet. Control then proceeds to "Add Incoming Packet (Including Payload) to Suspected Threat Packets" step 358 to preserve the payload value of the incoming packet for comparison with future suspected threat packets.

At "Linked Packet Found?" decision point 352, if a linked packet is found in the suspected threat packets, control proceeds to "Compare Payload Data of Incoming Packet to Previously-Observed Payload Data of Linked Packet" step 353, where the payload data of the incoming packet is compared to the payload data of the linked packet. "Raw" payload values may be compared, or a value may be calculated from the incoming packet's payload and compared to previously-calculated values stored in the previously-observed payload data for the suspected threat packets. Comparing incoming payload data to previously-observed set of payload data of a linked packet can be performed by a payload-comparing apparatus, module, means, and/or instructions.

From "Compare Payload Data of Incoming Packet to Previously-Observed Payload Data of Linked Packet" step 360, control proceeds to "Payload Match Found?" decision point 354. If the payload data of the linked packet matches the payload data of the incoming packet, a code block that is the same has been identified, thereby identifying a propagating threat. At "Payload Match Found?" decision point 354, if the payloads match, control then proceeds to "Process Incoming Packet as Part of Rapidly Propagating Threat" step 356. Processing the incoming packet as part of a rapidly propagating threat can be performed by a threat-processing apparatus, module, means, and/or instructions.

At "Payload Match Found" decision point 354, if the payload of the linked packet and the incoming payload do not match, control can proceed to "Add Incoming Packet (Including Payload) to Suspected Threat Packets" step 358. Even thought the payload did not match the payload of another suspected threat packet, the incoming packet is also a suspected threat packet due to the matching invariant header data in a packet linked to the incoming packet. This step preserves the payload value of the incoming packet for comparison with future suspected threat packets. As previously mentioned, the raw payload data may be stored as part of the set of suspected threat packets. Alternatively, a value may be calculated from the payload data that uniquely represents the value of the payload data. Adding the incoming packet to a set of suspected threat packets can be performed by an adding apparatus, module, means, and/or instructions.

At "Process Incoming Packet as Part of Rapidly Propagating Threat" step 356, mitigation can be performed. The source address for the incoming packet can be prevented from further communication until a suspected infection can be investigated, or packets can be discarded when they are determined to be part of a rapidly propagating threat. Many types of mitigation activities are possible at this point of the algorithm that has determined that a rapidly propagating threat is in progress, and the invention is not limited to any particular mitigation strategy.

FIGS. 3A and 3B show that packets are processed very efficiently using the method described in the depicted embodiment of the invention. Only packets that have the potential for propagating a threat are examined, and initially only the header data is examined. A relationship is established between packets showing a common address, and invariant data must match for an incoming packet to be considered as a suspected rapidly propagating threat. Payload data is not examined unless the header data indicates a suspected rapidly propagating threat.

In other embodiments of the invention, if a particular type of payload can be identified as a threat, such payload values may be stored in a set of known threats. Depending upon the circumstances of the internal network environment, it may be preferable to compare incoming payload values initially to payloads in the set of known threats. If a match is found, the source address of the incoming threat packet can be immediately identified as a known threat and communication with that source address can be mitigated.

FIG. 4 is a flowchart showing one possible implementation of the "Process Incoming Packet as Part of Rapidly Propagating Threat" step 356 of the flowchart of FIG. 3B. In the embodiment described with reference to FIGS. 3A and 3B, at this point in the algorithm, the incoming packet has been shown to have propagated as a communication containing linked packets that are characteristics of a suspected rapidly propagating threat. Furthermore, the incoming packet has been determined to have invariant data, such as destination port and protocol, that are the same as those of the linked packet. In addition, the source address of the incoming packet has been shown to have propagated a payload value that has been determined to represent a threat. As a result, the source address of the incoming packet can be added to an infected site list in "Add Source Address of Incoming Packet to Infected Site List" step 410. Control then proceeds to "Traverse Suspected Threat Packets for Another Linked Packet" step 420. Traversing the previously-observed packets may identify the address that infected the source address of the incoming packet. This traversal is discussed further in detail with reference to FIGS. 6A through 6D below.

If the address that infected the source address of the incoming packet can be identified, the infecting address can be added to the infected site list in "Add Infecting Address to Infected Site List" step 430. In "Determine Threat Type" step 440, the threat may be classified into a particular type of threat. Control can then proceed to "Add Threat Type and Payload Data to Known Threat List" step 450, and the threat type and newly-discovered "signature" payload data can be added to a known threat list. Such a list may be used to initially compare with incoming payloads for quick identification of the newly-discovered threat.

Figure 5:
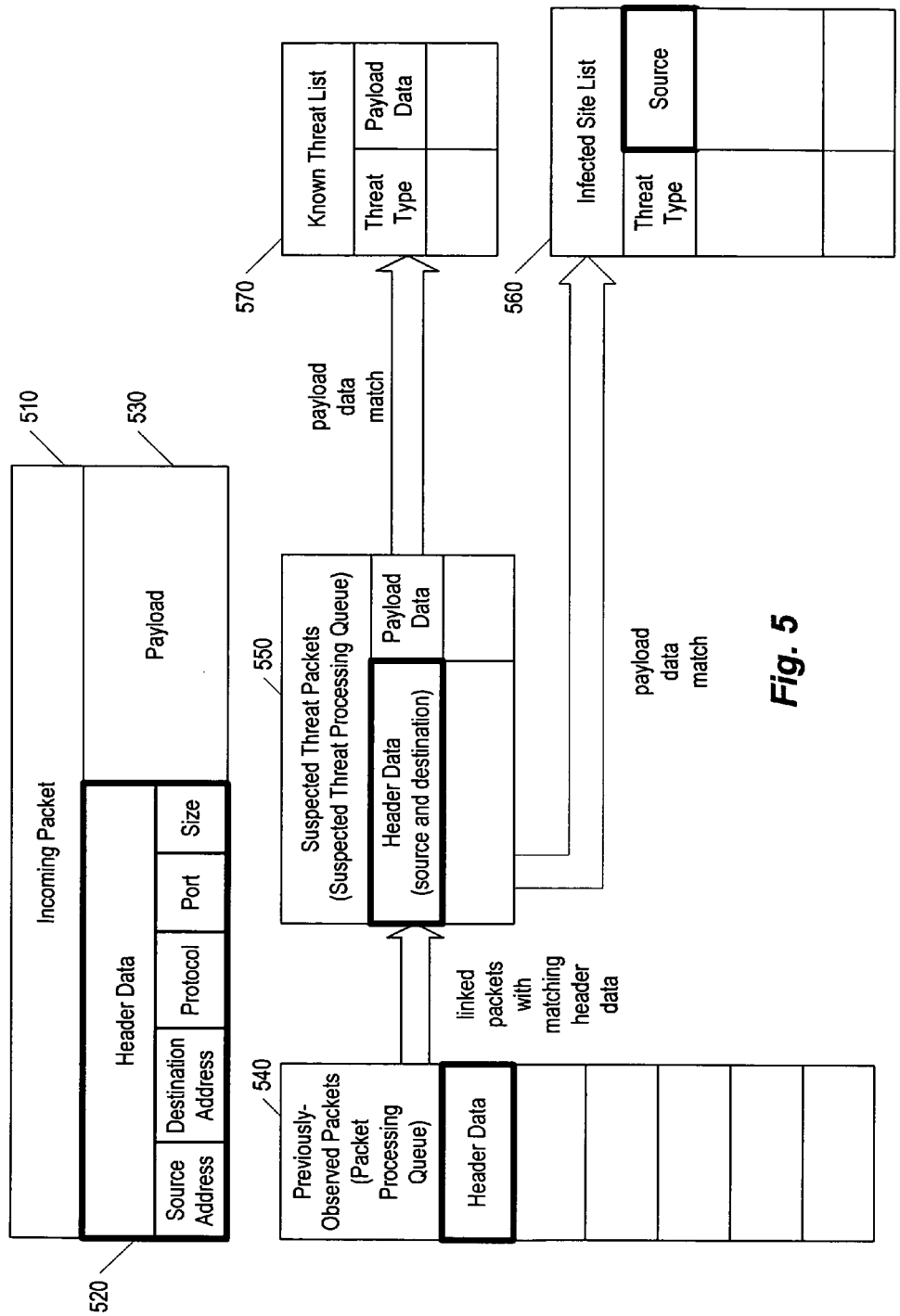
FIG. 5 is a diagram showing data structures for tracking packet flow, suspected threats, and infected sites in accordance with one embodiment of the invention.

FIG. 5 is a diagram showing data structures for tracking packet flow, suspected threats and infected sites in accordance with one embodiment of the invention. Incoming packet 510 contains header data 520 and a payload 530. Incoming packet 510 header data 520 is analyzed, and a set of invariant header data may be extracted. For example, assume that the protocol and port form the set of invariant data for packet 510, and that source address, destination address, and size may vary from one packet to another. When packet 510 is received, payload 530 is not placed in the packet processing queue initially. The set of invariant data from header data 520 of incoming packet 510 is extracted and determined to be of interest. At this point, header data (but not payload data) is placed into a set of previously-observed packets, which are represented in FIG. 5 by packet processing queue 540. Previously-observed packets are searched for a packet that is "linked" to the incoming packet. A previously-observed packet is considered to be linked if the previously-observed packet has a destination address that is the same as the source address of the incoming packet.

If a pair of linked packets in packet processing queue 540 has matching header data, some header data (typically source and destination addresses) and the payload data determined from the payload 530 of incoming packet 510 can be placed into a set of suspected threat packets 550 (which may be implemented as a suspected threat processing queue). As explained above, the raw payload or a unique value calculated from the raw payload may be placed into suspected threat processing queue 550. If the payload 530 of incoming packet 510 matches a payload of a linked packet in suspected threats processing queue 550, a rapidly propagating threat has been observed. The source address for incoming packet 510 can be placed into infected site list 560. Furthermore, a threat type can be determined, and the threat type and payload data can be entered into a known threat list 570.

FIGS. 6A through 6D show a series of events as packets are processed in accordance with the embodiment of the invention shown in the flowcharts of FIGS. 3A and 3B. Starting with FIG. 6A, in event 7.1, packet 1 is observed. Packet 1 has a source of A, a destination of B, invariant header data H1, and a payload P1. In event 6.2, packet 1 header data is placed into a set of previously-observed packets (which may be implemented as a packet processing queue). At this time, no suspected threats have been identified to be placed into the set of suspected threat packets (which may be implemented as a suspected threat processing queue), which is shown as empty. In addition, no infected sites have been identified.

In event 6.3, the set of previously-observed packets is searched for a destination address having a value of A, which is indicative of a packet linked to the incoming packet 1. Since only packet 1 is in the set of previously-observed packets, no other packet can be found as linked to packet 1, as indicated by event 6.4. No changes are made to the set of previously-observed packets or to the set of suspected threat packets.

Moving to FIG. 6B, in event 6.5, packet 2 is observed. Packet 2 has a source of B, a destination of C, invariant header data H1, and a payload of P1. In event 6.6, packet 2 is added to the set of previously-observed packets. In event 6.7, the set of previously-observed packets is searched for a linked packet. Recall that a linked packet has a destination address matching the source address of the incoming packet. In event 6.8, the destination address for packet 1 (node B) is found to match the source address of the incoming packet (node B), as shown in bold. In event 6.9, a determination is made that the set of linked packets (packet 1 and packet 2) have matching invariant header data with a value of H1. Consequently, in event 6.10, the incoming packet 2 is processed as a suspected threat and the source, destination, header data, and payload for packet 2 are added to the set of suspected threat packets. In the example shown in FIG. 6B, when packet 2 is added to the set of suspected threat packets, packet 2 is removed from the set of previously-observed packets. In other embodiments, a packet may remain in both the set of previously-observed packets and the set of suspected threat packets.

Moving to FIG. 6C, in event 6.11, processing of packet 2 as a suspected threat packet begins. In event 6.11, the set of suspected threat packets is searched for a packet linked to incoming packet 2. Because incoming packet 2 is the first entry into the set of suspected threat packets, no linked packet can be found to verify that a rapidly propagating threat is in progress, as shown in event 6.12. However, the payload value for incoming packet 2 has been added to the set of suspected threat packets for comparison with future incoming packets.

Moving to FIG. 6C, packet 3 is observed, having a source of C, a destination of D, invariant header data H1, and a payload of P1. In event 6.14, packet 3 is added to the set of previously-observed packets. In event 6.15, the previously-observed packets and the set of suspected threat packets are searched for a packet that is linked to packet 3. Recall that a linked packet has a destination address matching the source address of the incoming packet. In event 6.16, the destination address for packet 2 (node C) in the suspected threat packets is found to match the source address of the incoming packet 3 (node C), as shown in bold. Furthermore, a determination is made that the linked packet and the incoming packet (packet 2 and packet 3) have matching invariant header data with a value of H1.

Moving to FIG. 6D, in event 6.17, the incoming packet 3 is processed as a suspected threat and the source, destination, header data, and payload for packet 3 are added to the set of suspected threat packets. Note that packet 3 is removed from the set of previously-observed packets when packet 3 is added to the set of suepcted threat packets. One of skill in the art will understand that removing the packet from the set of previously-observed packets is optional for efficiency purposes and is not required.

In event 6.18, the payload of incoming packet 3 is compared to the payload of the linked packet 2 from the set of suspected threat packets. In event 6.19, the payloads of the linked packets 2 and 3 are found to match. As a result, the source address of the incoming packet (node C) is identified as an infected site in event 6.20 due to node C having propagated a packet with matching invariant header data and payload data.

Having identified one infected site, it is possible to traverse the set of suspected threat packets to search for other possibly infected sites. Packets that have a destination address of an infected site have propagated a payload that has been identified as a threat. Such sites can be designated as an infected site with a medium level of certainty. In event 6.21, the set of suspected threat packets is traversed for a packet having a destination address that has been identified as an infected site. In event 6.22, a packet (packet 2) having a destination address matching infected site (node C) is found; thus, the source address of the linked packet (node B) can be identified as a threat with a medium level of certainty, despite the fact that propagation of payload P1 to node B has not been observed in the set of suspected threats.

The rapidly propagating threat detection algorithm of the present invention provides many advantages. Once a rapidly propagating threat is identified, communication between the network and the attacker can be controlled, preventing further damage. Packets are processed very efficiently. Only packets that have the potential for propagating a threat are examined, and initially only the header data is examined. Payload data is not examined unless the header data indicates a suspected rapidly propagating threat.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein.

A system, method, apparatus and computer-readable medium have been described to detect rapidly propagating threats in a network. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A method comprising:
   in a first computer:
   capturing a first packet sent from a first source to a first destination; extracting a set of header data from a first header of the first packet; capturing a second packet sent from the first destination to a second destination;
   if the set of header data is present in a second header of the second packet, processing the second packet as an indicator of a suspected rapidly propagating threat;
   capturing a third packet sent from the second destination to a third destination; searching the set of suspected threat packets for a linked packet to the third packet,
   wherein the linked packet has the second destination as a destination address;
   if the linked packet is found, comparing corresponding payload data for the linked packet to third payload data of the third packet, and
   if the corresponding payload data for the linked packet matches the third payload data,
   processing the third packet as part of a rapidly propagating threat.

2. The method of claim 1, wherein
the processing the second packet as an indicator of a suspected rapidly propagating threat comprises:
saving the second packet in a set of suspected threat packets.

3. The method of claim 1 wherein
the third payload data is calculated as a hash value using a third payload of the third packet.

4. The method of claim 1 wherein
the third payload data is a raw payload of the third packet.

5. The method of claim 1 wherein
processing the third packet as an indicator of a rapidly propagating threat comprises adding a source of the third packet to a set of infected sites.

6. The method of claim 1 wherein
processing the third packet as an indicator of a rapidly propagating threat comprises adding a payload of the third packet to a set of known threats.

7. The method of claim 1 wherein
processing the third packet as an indicator of a rapidly propagating threat comprises adding a hash value of a payload of the third packet to a set of known threats.

8. The method of claim 1 wherein
processing the third packet as an indicator of a rapidly propagating threat comprises determining a threat type for the third packet.

9. The method of claim 1 wherein
the second packet is one of a number of subsequent packets captured after the first packet was captured, and
the third packet is one of a number of subsequent packets captured after the second packet was captured.

10. The method of claim 1 wherein
the set of header data comprises a protocol and a destination port.

11. The method of claim 1 wherein
the set of header data comprises a protocol, a destination port, and a size of the packet.

12. The method of claim 1 wherein
the set of header data comprises a protocol, a destination port, and a size range of the packet.

13. The method of claim 1 wherein
no signature is available to identify the suspected rapidly propagating threat.

14. The method of claim 1 wherein each corresponding payload is associated with a plurality of counts, wherein each count of the plurality of counts is a number of times that each element of a
plurality of elements appears in the corresponding payload.

15. The method of claim 14 wherein
each element of the plurality of elements is a bit pattern.

16. The method of claim 14 wherein
each element of the plurality of elements is a character.

17. The method of claim 14 wherein
each element of the plurality of elements is a set of bytes.

18. The method of claim 14 wherein each element of the plurality of elements is a symbol.

19. A computer-readable storage medium comprising:
first capturing instructions to capture a first packet sent from a first source to a first destination;
extracting instructions to extract a set of header data from a first header of the first packet;
second capturing instructions to capture a second packet sent from the first destination to a second destination;
processing instructions to process the second packet as an indicator of a suspected rapidly propagating threat if the set of header data is present in a second header of the second packet;
third capturing instructions to capture a third packet sent from the second destination to a third destination;
searching instructions to search the set of suspected threat packets for a linked packet to the third packet, wherein the linked packet has the second destination as a destination address;
comparing instructions to compare corresponding payload data for the linked packet to third payload data of the third packet if the linked packet is found; and
second processing instructions to process the third packet as part of a rapidly propagating threat if the corresponding payload data for the linked packet matches the third payload data.

20. The computer-readable storage medium of claim 19, further comprising:
saving instructions to save the second packet in a set of suspected threat packets.

21. The computer-readable storage medium of claim 19, further comprising:
adding instructions to add a source of the third packet to a set of infected sites.

22. The computer-readable storage medium of claim 19 further comprising:
adding instructions to add a payload of the third packet to a set of known threats.

23. The computer-readable storage medium of claim 19 further comprising:
adding instructions to add a hash value of a payload of the third packet to a set of known threats.

24. The computer-readable storage medium of claim 19 further comprising:
determining instructions to determine a threat type for the third packet.

25. A computer system comprising:
a processor for executing instructions, and
the computer-readable storage medium of claim 19, wherein
the computer-readable medium is coupled to the processor.

26. An apparatus comprising:
computer-readable storage medium including:
a first capturing module to capture a first packet sent from a first source to a first destination;
an extracting module to extract a set of header data from a first header of the first packet;
a second capturing module to capture a second packet sent from the first destination to a second destination;
a processing module to process the second packet as an indicator of a suspected rapidly propagating threat if the set of header data is present in a second header of the second packet
a third capturing module to capture a third packet sent from the second destination to a third destination;
a searching module to search the set of suspected threat packets for a linked packet to the third packet, wherein the linked packet has the second destination as a destination address;
a comparing module to compare corresponding payload data for the linked packet to third payload data of the third packet if the linked packet is found; and
a second processing module to process the third packet as part of a rapidly propagating threat if the corresponding payload data for the linked packet matches the third payload data.

27. The apparatus of claim 26, further comprising:
a saving module to save the second packet in a set of suspected threat packets.

28. The apparatus of claim 26, further comprising:
an adding module to add a source of the third packet to a set of infected sites.

29. The apparatus of claim 26, further comprising:
an adding module to add a payload of the third packet to a set of known threats.

30. The apparatus of claim 26, further comprising:
an adding module to add a hash value of a payload of the third packet to a set of known threats.

31. The apparatus of claim 26, further comprising:
a determining module to determine a threat type for the third packet.

32. A system comprising:
unit for capturing, by a processor, a first packet sent from a first source to a first destination;
unit for extracting a set of header data from a first header of the first packet;
unit for capturing a second packet sent from the first destination to a second destination; and
unit for processing the second packet as an indicator of a suspected rapidly propagating threat if the set of header data is present in a second header of the second packet
unit for capturing a third packet sent from the second destination to a third destination;
unit for searching the set of suspected threat packets for a linked packet to the third packet, wherein
the linked packet has the second destination as a destination address;

unit for comparing corresponding payload data for the linked packet to third payload data of the third packet if the linked packet is found; and unit for processing the third packet as part of a rapidly propagating threat if the corresponding payload data for the linked packet matches the third payload data.

33. The system of claim 32, further comprising:

means unit for saving the second packet in a set of suspected threat packets.

* * * * *